Oct. 6, 1959 — J. M. HAIT — 2,907,440
FRUIT FEEDING AND ORIENTING MEANS
Original Filed June 19, 1950 — 7 Sheets-Sheet 5
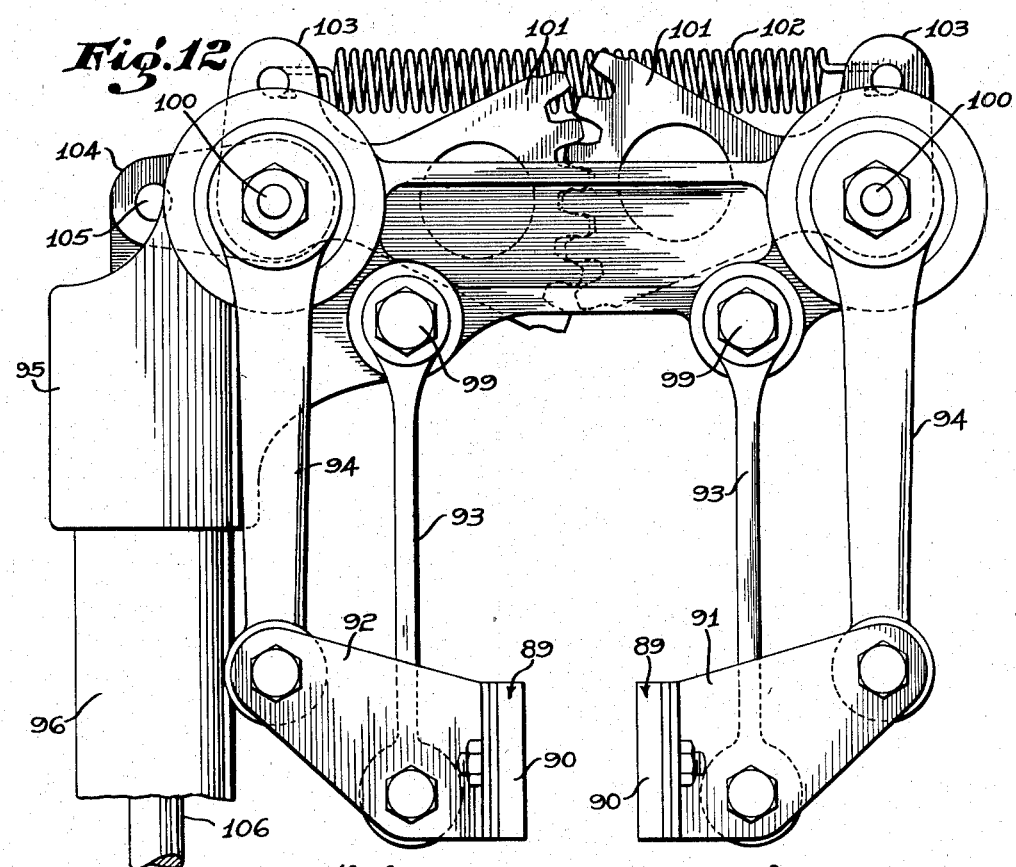
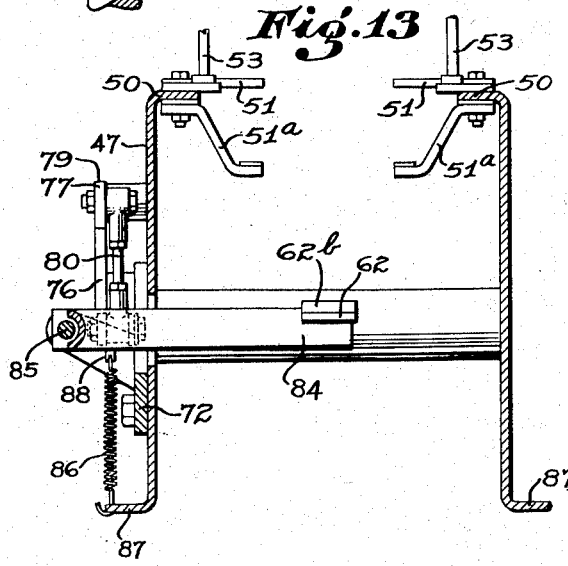
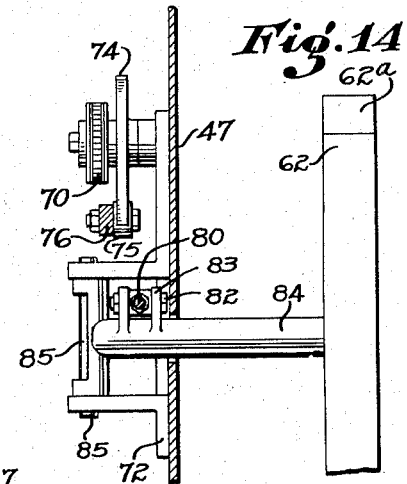
INVENTOR.
JAMES M. HAIT
BY Lyon & Lyon
ATTORNEYS.

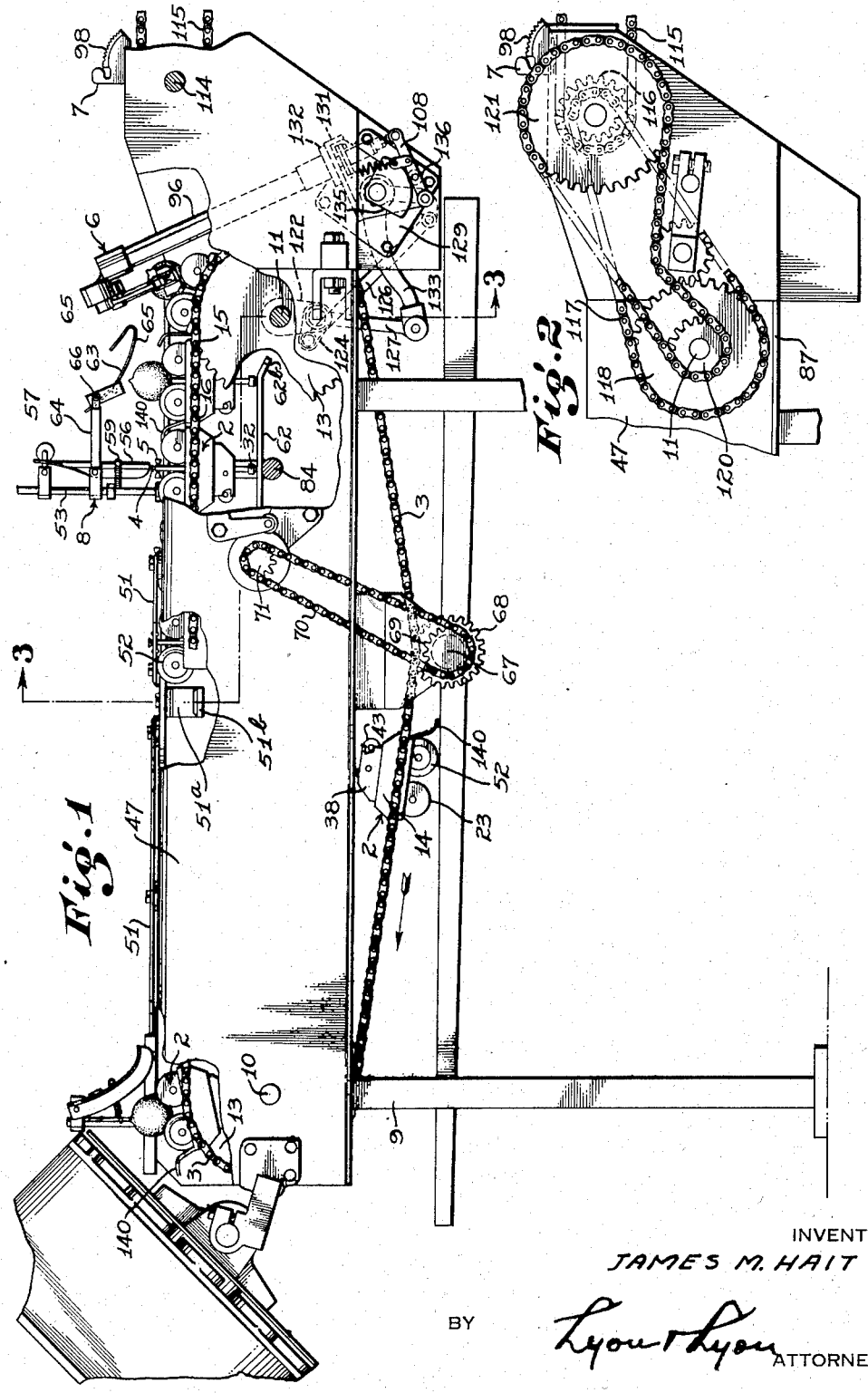

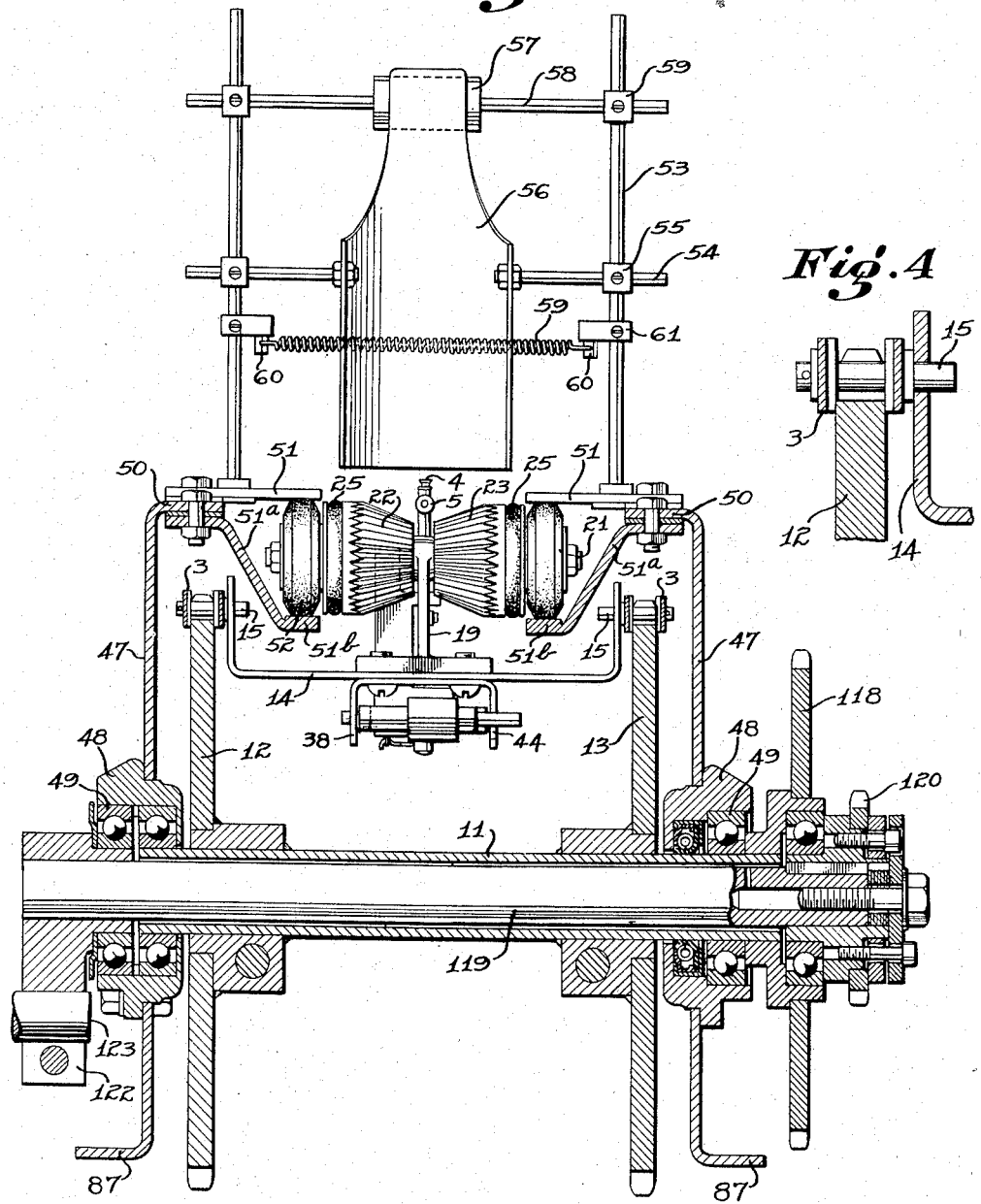

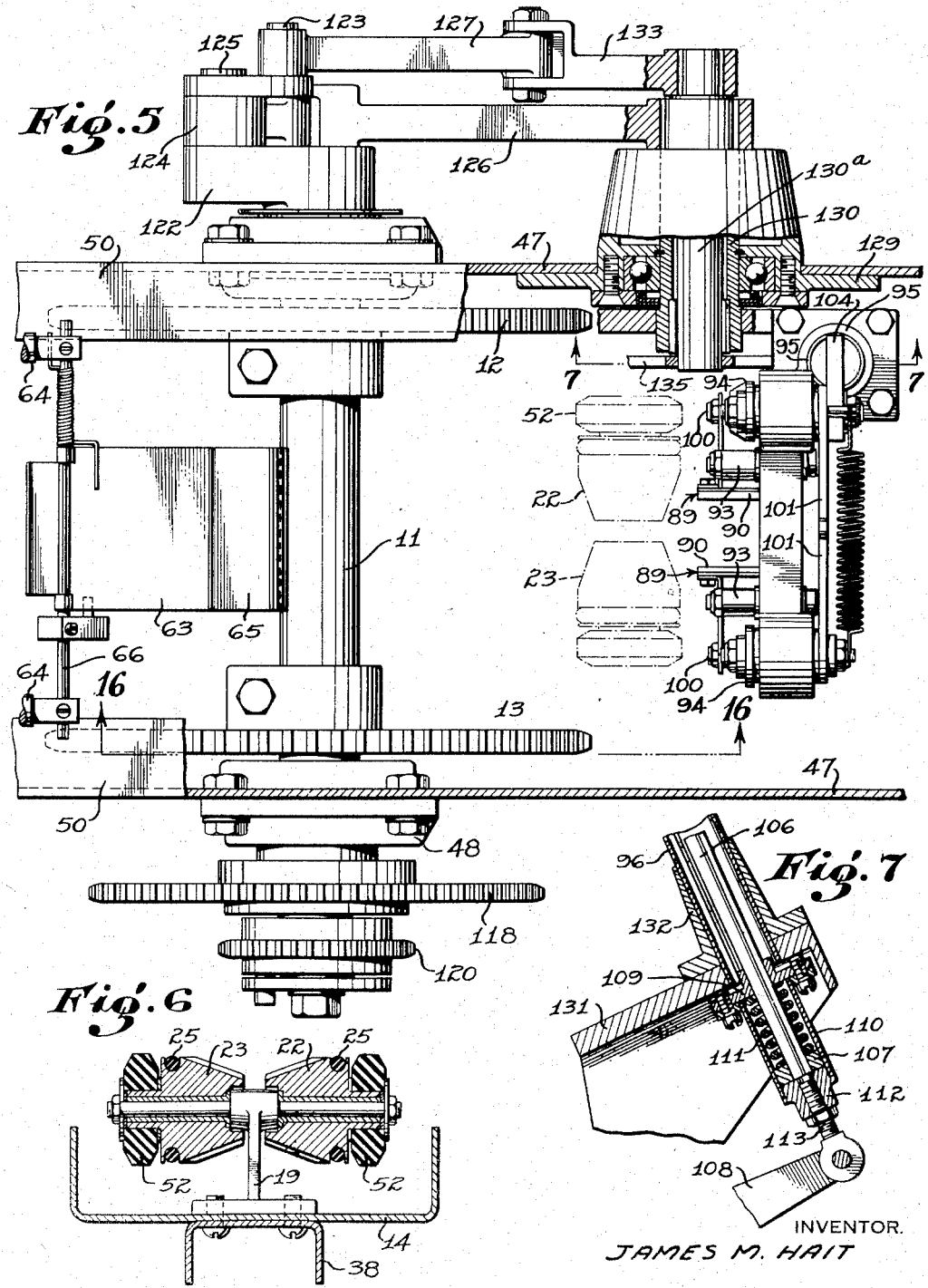

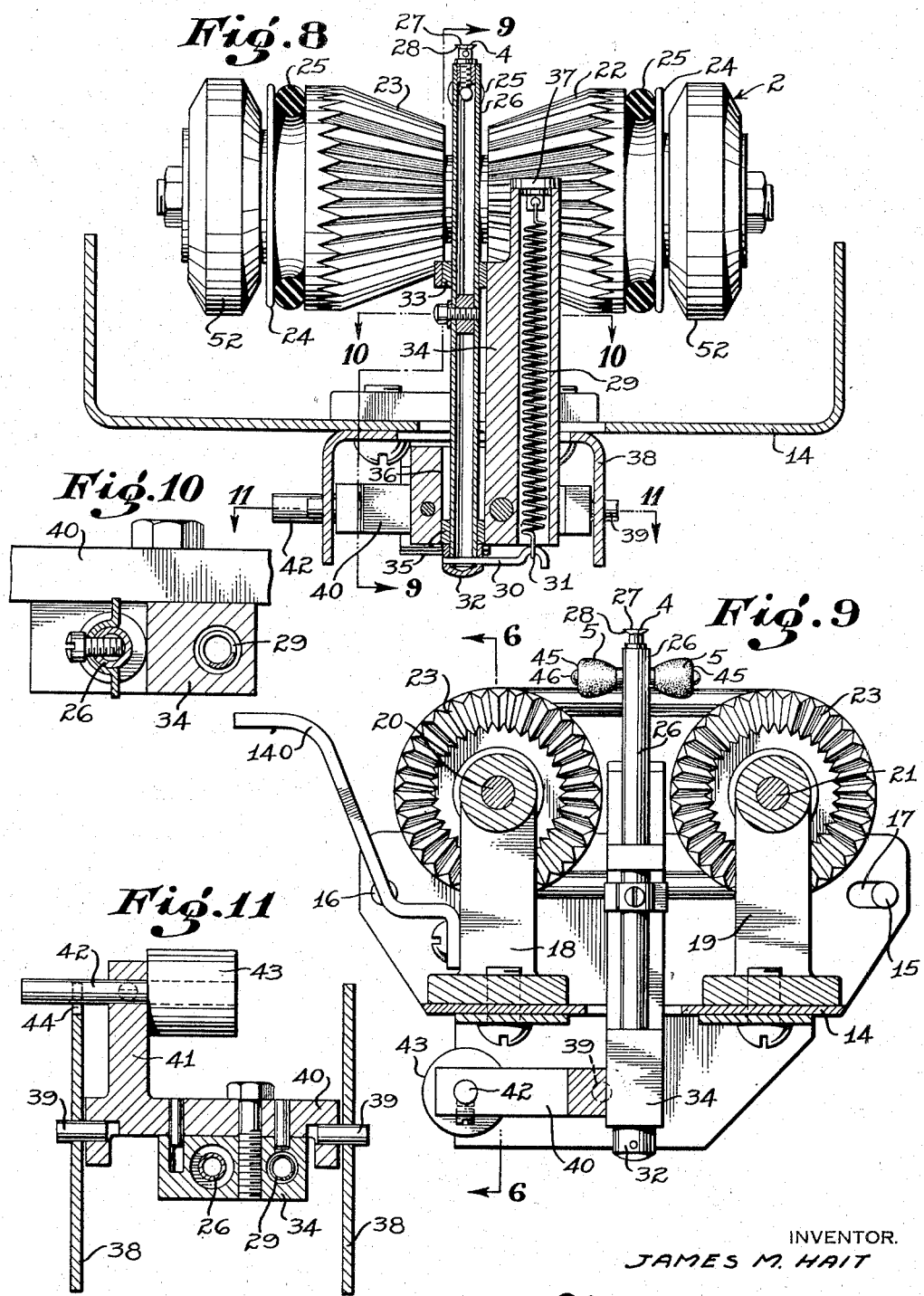

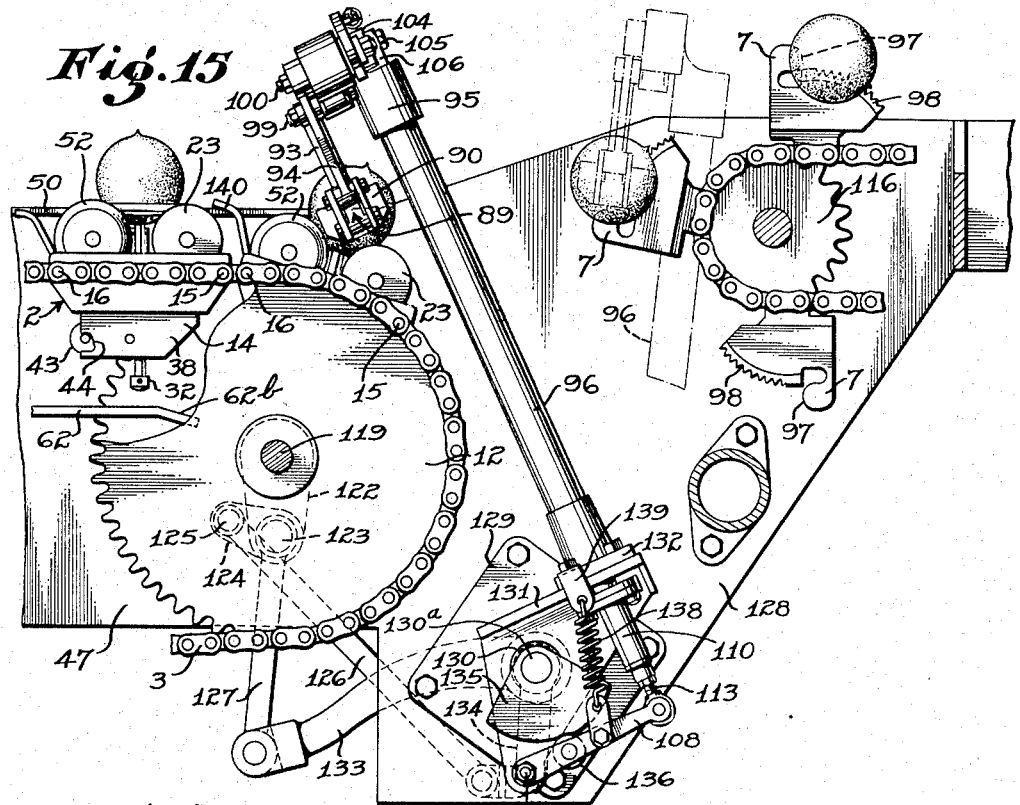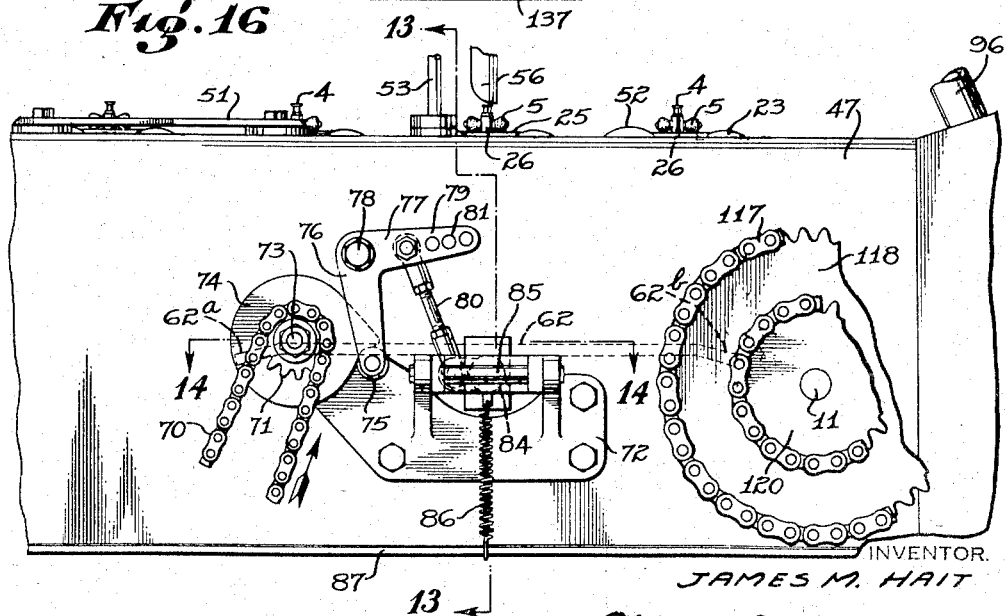

Oct. 6, 1959 J. M. HAIT 2,907,440
FRUIT FEEDING AND ORIENTING MEANS
Original Filed June 19, 1950 7 Sheets-Sheet 7

INVENTOR.
JAMES M. HAIT
BY Lyon & Lyon
ATTORNEYS.

United States Patent Office 2,907,440
Patented Oct. 6, 1959

2,907,440

FRUIT FEEDING AND ORIENTING MEANS

James M. Hait, San Jose, Calif., assignor, by mesne assignments, to Food Machinery and Chemical Corporation, San Jose, Calif., a corporation of Delaware Original application June 19, 1950, Serial No. 169,042. Divided and this application April 2, 1953, Serial No. 346,373

9 Claims. (Cl. 198—33)

This invention relates to a fruit feeding and orienting mechanism for feeding fruit to a processing machine and is more particularly directed to a fruit feeding and orienting mechanism for use in orienting indented fruit to position the fruit during the feed not only with reference to the indentation, but to orient the fruit in a plane of reference such as the plane of suture of a clingstone peach.

In referring to indented fruit I refer to fruit such as peaches, apricots, and other similar or like fruit which has an indent at one end and which indent has generally a major and minor diameter so that one of the diameters, here the major diameter, lies in the plane which serves as a reference plane for the processing of the fruit.

While this machine was particularly designed for and is adapted for use in feeding peaches to a processing machine, its adaptation is obviously not limited to such a machine, nor are its features of novelty limited to this particular type of fruit or its processing.

There are many fruits processed which involve locating of the fruit in a proper plane so that they may be halved in this plane as a step in their processing. It is to the feeding of this type of fruit that this invention is particularly directed.

For many years fruit processing machines have been utilized which have required hand feeding of the fruit because of the requirement that the fruit must be fed to the machine in a particular position or in a particular plane of the fruit in order to obtain satisfactory processing. As previously stated, this machine was particularly designed for the feeding of peaches to a processing machine in which fruit is halved in its plane of suture and where the fruit is fed into the machine with reference to its calyx indent so that the fruit may be satisfactorily pitted after being halved, together with the pit, so that the shallow pit halves lie in each half of the fruit from which they are subsequently removed by the pitting mechansim.

It has long been realized that, with a satisfactory machine for feeding peaches to such a processing machine, a great saving in overall cost of the processing of the fruit could be obtained because of the greater efficiency of such operation and the elimination of the problems of the uncertainty of manual operations due to the unavailability of the large quantity of relatively skilled labor required at peak of operation when the fruit is in the optimum condition for such processing.

It is therefore an object of this invention to provide means for feeding fruit from a hopper or other suitable delivery device to a processing machine and for orienting the fruit during the time of feeding of the fruit from the delivery device to the processing machine so that it may be properly transferred into the processing machine in predetermined position.

Another object is to provide means in the path of movement of the fruit and prior to delivery of the fruit to the processing machine for ejecting all fruit which is not properly positioned prior to transfer into the processing machine.

Another object of this invention is to provide a fruit feeding and aligning mechanism which includes a fruit support and aligning member upon which a fruit is supported and by which the fruit is aligned and wherein means are employed for moving the fruit supporting and aligning member through a feed path having near its end a means for engaging the periphery of the fruit in the direction of its travel to displace from the supporting and aligning member fruit which is not properly aligned and positioned.

Another object of this invention is to provide a fruit feeding and orienting mechanism which includes a fruit supporting member, a means for aligning the fruit upon the supporting member with relation to an indent thereon for orienting the fruit with reference to a reference plane and wherein the supporting member is moved through a path adjacent the end of which an ejecting mechanism is employed which operates to displace fruit from the supporting mechanism which is not properly oriented thereon.

Another object of the present invention is to provide means for vibrating the fruit during a portion of its travel through the feeding and orientating mechanism to promote and assist in the final alignment of the fruit.

Another object of this invention is to provide a fruit feeding and orienting mechanism in which means are provided to locate an indent in the fruit surface, such as the calyx indent of a peach, means to reject fruit from the feeding mechanism, the indent of which has not been located, and means to orient the fruit into position with reference to the plane of reference desired.

Another object of this invention is to provide a fruit feeding and orienting mechanism in which means are provided to locate an indent in the fruit such as to reject improperly located fruit from the feeding mechanism, to orient and lock or hold the fruit in a reference plane, and to eject from the feeding means fruit not properly oriented.

Another object of this invention is to provide a means in a fruit orienting mechanism for orienting a fruit at its plane of suture from its elongated calyx indent.

Another object of this invention is to provide an improved form of fruit feeding and orienting mechanism adapted to feed fruit in predetermined position to a processing machine.

Other objects and advantages of this invention it is believed will be apparent from the following detailed description of a preferred embodiment thereof as illustrated in the accompanying drawings.

In the drawings:

Figure 1 is a side elevation partly broken away for the purpose of illustration and showing a fruit feeding and orienting mechanism embodying my invention as interposed between a feed means and a fruit processing machine, both of which are fragmentally illustrated, Figure 2 is a fragmental view illustrating the integrating drive between the feed mechanism and the fruit processing machine.

Figure 3 is a sectional end view taken substantially on the line 3—3 of Figure 1.

Figure 4 is a fragmental sectional view illustrating the manner of connecting the fruit support frame plates to their conveying chains.

Figure 5 is a plan view partly in horizontal section of the end portion of the feed and orienting means embodying my invention and showing its relation to a fragment of the processing machine to which the fruit is delivered.

Figure 6 is a sectional elevation taken substantially on the line 6—6 of Figure 9 of one of the drive rollers of the supporting and orienting means embodying my invention.

Figure 7 is a sectional view taken substantially on the line 7—7 of Figure 5.

Figure 8 is an elevation of one of the fruit supporting elements embodied in my invention and illustrating the same partly in vertical section.

Figure 9 is a side elevation partly in horizontal section taken on the line 9—9 of Figure 8 of one of the fruit supporting elements supporting my invention.

Figure 10 is a fragmental sectional view taken substantially on the line 10—10 of Figure 8.

Figure 11 is a fragmental sectional plan view taken substantially on the line 11—11 of Figure 8.

Figure 12 is a detached elevation of the fruit transfer means embodied in my invention.

Figure 13 is a sectional end elevation fragmental in form taken substantially on the line 13—13 of Figure 16 and illustrating particularly the means provided for elevating the indent finder at the time the fruit supporting means is approaching and passing under the misaligned fruit ejecting mechanism.

Figure 14 is a plan view of the structure illustrated in Figure 3 and taken substantially on the line 14—14 of Figure 16.

Figure 15 is a fragmental elevation illustrating the transfer of the properly aligned and oriented fruit from the feed and orienting mechanism to the processing machine.

Figure 16 is a fragmental side elevation showing particularly the operating mechanism for vibrating the indent finder to effect final alignment of the fruit prior to discharge of fruit from such supporting members that have not been properly oriented.

Figure 17:
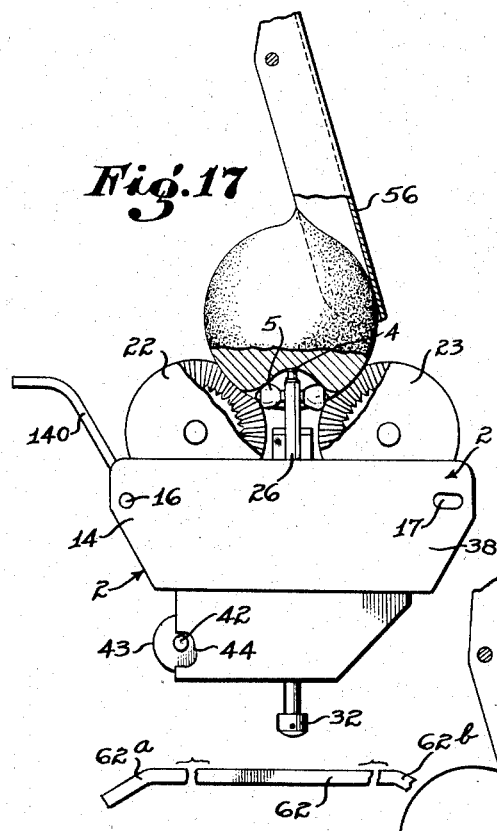
Figures 17, 18 and 19 are diagrammatic illustrations showing the orientation and positioning of a peach upon the supporting members and the operation in the displacing of non-oriented fruit from the said supports.

This application is a division of the patent application Serial No. 169,042 for Fruit Feeding and Orienting Means, filed June 19, 1950.

In the preferred embodiment of my invention as illustrated in the accompanying drawings, I have shown my invention as particularly adapted for the feeding and orienting of clingstone peaches to a clingstone peach processing machine wherein the peaches to be oriented are oriented from their elongated calyx depressions so that the fruit is delivered to the pick-up blades of the processing machine with the fruit thereon in their planes of suture and so that the fruit has its pit located in a determined position upon the blade of the processing machine.

In accordance with my invention, fruit is indiscriminately delivered to a hopper 1 (Fig. 1) which may be of any suitable construction as, for example, illustrated in the copending application of James M. Hait and Bruce H. Kellogg for Method and Apparatus for Orienting Indented Fruit, Serial No. 62,046, filed in the United States Patent Office on or about November 26, 1948. The fruit from said hopper is delivered one at a time, in position to be received in pockets formed by opposing fruit supporting elements 2 of a conveyor 2a which includes endless chains 3 adapted to move the fruit supporting elements 2 through a feed path in which the fruit is oriented.

As the fruit is progressed along this path on the supporting elements 2, it is rotated until the indent finder 4 finds the calyx indent or depression, so that its bud tip is in a substantially vertical position. Fruit that is not properly positioned with the finder locating the calyx indent is removed from between the fruit supporting elements and is subsequently discharged from the conveyor without transfer to the fruit processing machine while all fruit remaining in the pockets between opposing fruit supporting elements which has not been fully oriented is now finally oriented in the remaining path of the conveyor and a second ejector may then operate to dislocate any still improperly positioned fruit before operation of the transfer mechanism 6 which operates to transfer the fruit from the supporting members 2 to the impaling blades 7 of the fruit processing machine.

The means for scanning the surface of the fruit with the indent finder 4 may be of any suitable or desirable construction, the preferred form of which is herein illustrated as including:

A suitable frame 9 (Fig. 3) is provided which supports spaced apart conveyor shafts 10 and 11. Upon the shafts are secured spaced apart chain sprockets 12 and 13 upon which the conveyor chains 3 are supported. Supported between the spaced apart conveyor chains 3 are fruit support frame plates 14 which are carried on pins 15 secured at spaced intervals to the links of the chains 3. The pins 15 (see also Fig. 4) are passed through pin apertures 16 and 17 formed at the opposed ends of the plates 14 and the apertures 17 are elongated (Fig. 17) so as to permit the necessary relative movement between the chain pins 15 and the plates 14 when the chains pass around the sprockets 12 and 13.

Secured to the frame plates 14 (Figs. 3 and 9) are supporting roller standards 18 and 19 provided at their upper ends with bearing bosses in which the roller shafts 20 and 21 are journaled. The shafts 20 and 21 extend outwardly on the opposite sides of the standards 18 and 19 and supporting cone rollers 22 and 23 (Fig. 8) are secured to the oppositely extending ends of the shafts 20 and 21 forming between the four conical rollers a fruit receiving pocket into which the fruit is positioned as it is fed from the hopper 1.

As will be apparent from Figure 8, the conical rollers 22 and 23 are formed at their outer ends to provide belt pulleys 24 so that the opposed conical rollers supported upon the two shafts 20 and 21 may be connected in driving and driven relation through the medium of belts 25. The conical rollers 22 and 23 have their faces serrated in a suitable manner so as to increase the coefficient of friction with the fruit supported thereby so that, as the cones 22 and 23 are rotated, the fruit supported between such rollers is likewise rotated to present its entire surface to the indent finder 4 so that the finder 4 may pass into the calyx depression of the fruit.

The indent finder 4 is supported approximately centrally of the four conical rollers 22 and 23 and is preferably of the following construction so that it will not only find the indent but also may be operated to orient the fruit with relation to the elongated calyx cavity thereof so as to determine the position of the fruit upon the supporting elements 2.

As herein illustrated, the finder includes a tube 26 at the upper end of which there is mounted in any suitable or desirable manner a finder head 27 which has a lip 28 formed thereon which may engage in the flesh of the fruit in the calyx depression for the purpose that will hereinafter appear.

The tube 26 (Figure 8) is mounted to be vertically reciprocal and is held in upward advanced position yieldable through the medium of a spring 29 which is secured to the lower end of the tube 26 through the medium of a hook 30 which is passed through the free end 31 of the spring 29 and is secured to the lower end of the tube 26 by passing through the transverse bores formed in the tube and the tube cap 32. The tube 26 is guided in its vertical reciprocation by passing through a bearing boss 33 formed as an extension of the spring housing 34 and having a guide bar 35 mounted near its lower end to fit within the bearing channel 36 formed in the lower boss extension of the spring housing 34. The spring 29 is mounted in the spring housing 34 and is secured at its upper end to a spring cap 37 which closes the upper end of the spring housing 34.

The spring 29 is a light spring sufficient only to move the finder 4 upwardly when not engaged with a fruit and is of only such strength as to exert a slight upward force on the finder 4 so as to maintain the same in contact with the surface of a fruit supported between the rollers 22 and 23 as such fruit is rotated so that the finder will scan the fruit surface until the calyx indent is located. The finder 4 will then be raised into the indent by the spring 29.

The finder assembly thus described is supported from the frame plate 14 in such manner as to permit the finder to rock in the direction of travel of the fruit through the finding path, and in order to accomplish this purpose, a U-shaped bracket 38 is secured to the under surface of the plate 14 in any suitable manner.

Pins 39 (Figure 11) are fitted between the leg of the bracket 38 and into bores formed in a counterweight plate 40 which is suitably secured to the spring housing 34. The counterweight 40 is formed with an arm 41 in which a shaft 42 is secured. The shaft 42 carries a weight 43 on its inner end and extends on the opposite side of the arm 42 to engage a suitable indent 44 in one leg of the U-shaped bracket 38 to limit the upward oscillation of the finder 4 under the influence of the counterweight formed by the roller 43. Supported by the finder tube 26 are the finder wings 5 which may be of any suitable construction, but which are herein illustrated as including shaped rollers 45 which are journaled upon a pin 46 passed through the tube 26. The shaped rollers 45 preferably have their smaller ends inward toward the axis of the tube 26 and their larger ends out therefrom.

In order to rotate the cones 22 and 23 and also to time this rotation and to provide for the suitable interruption of a state of equilibrium assumed by a fruit supported upon the supports 2, I have provided means for rotating the rollers at suitable intervals and for raising the finder 4, which means are preferably of the following construction:

Supported by the frame 9 (Figure 3) are side plates 47 which are spaced apart on the outer sides of the chains 3. The frame plates 47 carry the bearing hubs 48 within which the bearings 49 are mounted for rotatably supporting the conveyor shafts 10 and 11. The plates 47 have inturned flanges 50 at their upper ends and secured to these inturned flanges 50 are drive plates 51. The drive plates 51 extend inwardly to engage the friction drive roller 52 carried by the conical rollers 22 and 23 supported upon one shaft, i.e., the shaft 21 of the four conical roller supports. Thus as the supports 2 are progressed by the chain 3, one set of rollers 22 and 23 is caused to rotate. As the rollers are connected together by means of the drive belts 25, the opposite pair of rollers is likewise caused to rotate.

By interrupting the plate 51 at a suitable interval, the drive may be interrupted so that the rollers 22 and 23 come to rest. Means may be provided for reversing the drive of the rollers 22 and 23, which means are herein illustrated as comprising depending plates 51a (Figure 3) which are secured to the under face of the inturned flange of the side plates 47 and present a reversal track 51b to engage the rollers 52 at the points where the plate 51 is interrupted, thereby reversing the direction of the rollers 52. This reversal of the drive rollers 22 and 23 will upset any position of equilibrium that a fruit may have attained as supported by the rollers and where the finder 4 has not located the calyx indent in the fruit allowing the fruit to be rotated through a different position so that as the fruit is scanned with the finder 4, the calyx indent will be located.

Mounted over the path of movement of the fruit is a means 8 (Figure 1) for ejecting or dislocating fruit which is not properly oriented in passing through the first portion of the orienting path. This means may be of any suitable construction and is herein illustrated as providing means which engages the outer periphery of the fruit while the fruit is being elevated by the raising of the calyx finder 4 to a position of instability. At the time of elevation of the fruit by raising the calyx finder 4, the fruit is no longer rotated as the rollers 52 have passed beyond the end of the track 51.

As herein illustrated (Figures 1 and 3), this ejecting mechanism consists of a standard 53 formed of a pair of parallel rods secured to the drive plates 51 and which adjustably support a shaft 54 in suitable journaled blocks 55 so that the shaft may rotate. As herein illustrated, this shaft is an interrupted shaft and the ends of the interrupted shaft are secured to a curved plate 56 curved to present its convex concave side toward the fruit approaching the plate 56. The plate 56 is thus free to oscillate around the axis of the shaft 54. Means are provided for interrupting the oscillation of the plate 56 in substantially vertical position, which means are herein illustrated as including a stop element 57 which is carried by a shaft 58 supported in brackets 59 carried near the upper end of the frame 53. Means are provided which are adjustable in tension for releasably resisting the free oscillation of the plate 56 as it is engaged by the fruit passing thereunder, which means are herein illustrated as including a suitable coil spring or other flexible element 59 which is connected between the pin 60 of bracket 61 carried by the frame 53 below the shaft 54. By changing the spring 59 or other flexible element provided, the resistance to the free rotation of the plate 56 may be determined.

Just prior to the engagement of the ejector plate 56 with the fruit carried by the support 2 (Figure 1), I prefer to stop cone rotation and then to provide means for raising the finder 4 to lift the fruit off from the rollers 22 and 23 of the support 2 so that there is a more critical state of equilibrium provided between properly oriented and improperly oriented fruit. Where the indent of the fruit is located, the raising of the finder 4 may not raise the fruit from the supporting rollers, but where the indent finder is engaging the fruit surface but not in the indent, the fruit must be raised. To accomplish this result, I provide a lifting plate 62 (Figure 1) mounted within the frame 9 in position to engage the cap 32 carried at the lower end of the tube 26 to move the tube 26 and hence the finder 4 upwardly.

I have also provided for the purpose hereinafter stated in tandem with the ejector plate 56 a second ejector element 63 which will engage the fruit after it has passed out from under the ejector plate 56. To accomplish this result I provide a pair of arms 64 which extend outwardly from the frame 53 and between these arms I pivotally support a second striker plate 65 which is carried by a shaft 66 so that it may oscillate outward in the path of movement of the fruit as carried by the supports 2.

Means are provided for vibrating the fruit as it is raised with the finder 4, which may also aid in the orienting of the fruit, the calyx indent of which has been located by the finder 4. Vibrating the fruit by reciprocating the finder 4 while it is located in the calyx indent enables me to employ wings 5 on the finder to orient the fruit to rotate the fruit so that the wings 5 will find the greatest diameter of the elongated calyx indent. I prefer to form the wings 5 as substantially conical rollers. The roller wings 5 are journaled on pins 46 carried by the tube 26. The fruit thus supported on the supports 2, after passing under the ejector 56, will thus be oriented with its plane of suture lying in the line of travel of the fruit through the feed path. As the roller wings pass into the elongated calyx indent, they act to lock or hold the fruit oriented. Fruit which is not properly oriented may be ejected from the feed path in passing under the second ejector 65 to a position where it will not be transferred to the processing machine. The means provided for oscillating the fruit (and the fruit finder) is preferably of the following construction:

Secured in position on the frame in any suitable manner is an oscillator shaft 67 (Figure 1) which carries a sprocket 68 meshing with one of the chains 3. Secured to the oscillator shaft 67 is a drive sprocket 69 over which a drive chain 70 is trained to drive the sprocket 71 of the oscillator mechanism. The oscillator mechanism is supported by a bracket 72 upon one of the side plates 47 and the sprocket 71 is secured to a shaft 73 carried by the bracket 72. Secured to the shaft 73 is an actuator cam 74, the cam face of which is adapted to engage the cam roller 75 carried by one arm 76 of a bell crank 77 journaled on a pin 78 secured to the side plate 47. The opposite arm 79 carries an adjustable crank arm 80 in any one of a plurality of holes 81 formed along its length. The opposite end of the crank arm 80 is secured by a pin 82 between the ears 83 formed integrally with the supporting arm 84 (Figure 14) for the lift plate 62. The supporting arm 84 is journaled on a pin 85 carried by the bracket 72 at its outer end. A spring 86 is provided for normally urging the lift plate 62 to its lowermost position and this spring is connected between the outturned flange 87 and the side plate 47 and the bracket 88 carried by the arm 84.

In order to raise the finder 4, and hence the fruit on the supports 2, the lifting plate 62 (Figure 17) has an inclined race 62a at the entrance end for the cap 32 and has at its discharge end a similar incline 62b.

The means provided for transferring the fruit (Figure 12) from the supports 2 and for transferring the fruit to the impaling blades 7 of the operating machine may be of any suitable type or construction and are herein illustrated as including a pair of gripping elements 89. The gripping elements 89 may be provided with a resilient rubber pad facing 90. These gripping elements are carried at the ends of the arms 91, 92. The arms 91 and 92 (Figure 12) are pivotally supported at the ends of parallel links 93 and 94 to give the gripping elements a motion toward and away from each other.

A bracket 95 is mounted at the upper end of the oscillator post 96 and this post 96 is offset from the path of movement of the fruit to one side and is oscillated to move the gripping elements 90 from their pick-up position as illustrated in Figure 15 in full lines to the position of transfer shown in dotted lines. The fruit is picked up by the gripping elements 89 to a position where the impaling blade 7 of the operating machine may pass between the said gripping elements 89 and impale the fruit with the finder stop 97 of the said blades engaged in the calyx depression and with the fruit impaled upon the blade section 98 of the said impaling blade 7 at which time the gripping elements 89 are opened to release the fruit to impaling blades of the operating machine.

The foregoing description of a precise transfer mechanism is given for the purpose of illustration only and my invention is not in any way to be deemed limited to the structural features of the operating machine described or the particular transfer mechanism utilized.

The links 93 (Figure 12) are pivoted as indicated at 99 to the bracket 95 and the links 94 are pivoted on the pins 100 of the bracket 95. The links 94 are provided with integral gear segments 101 which mesh together so that the actuation of one link 94 results in a corresponding actuation of the other link 94. A spring 102 is connected between the ears 103 of the links 94 and acts to normally hold the gripping elements 89 in open position.

Means are provided for actuating the gripping elements, which means may be of any suitable or desirable construction and are herein illustrated as including an actuating arm 104 (Figure 12) secured to the pin 100 and to which the link 94 is secured. This arm 104 is secured by means of a pin 105 to an operating rod 106, which rod 106 is mounted within the post 96 and extends therethrough and has secured to its end a ring 107 (Figure 7).

A yieldable connection is provided between the operating crank 108 (Figures 5, 7 and 15) and the operating rod 106 which is here illustrated as including a roller 109 which is journaled on the rod 106 and is secured to a sleeve 110 in which sleeve 110 the ring 107 is mounted to reciprocate. A spring 111 is positioned within the sleeve 110 between the collar 109 and the ring 107. Thus as a force is imparted to pull the rod 106 downward to close the gripping elements 89, a yieldable connection is provided which permits the gripping elements to stop when they have engaged the surface of the fruit with the required force to lift the same and any further movement imparted by the operating arm 108 to pull the rod 106 downward is absorbed by the spring 111.

The sleeve 110 is secured by means of a threaded cap 112 adjustably to the screw 113 pivotally mounted at the end of the operating arm 108.

Means are provided for driving the conveyor chains 3, the transfer mechanism 6, and the operating machine in timed relation, which means may be of any suitable or desirable construction and are herein illustrated as including the following:

Mounted on the operating machine shaft 114 (Figures 1 and 2) is a sprocket over which the conveyor chain 115 carrying the impaling element 7 is trained. Also secured to the operating shaft 114 is a sprocket 116 over which a drive chain 117 is trained. The drive chain 117 is trained over the driven sprocket 118 secured to the shaft 11 of the orienting machine. The shaft 11 is a tubular shaft (Figure 3) and the sprocket 118 is secured to this tubular shaft. Journaled within the tubular shaft is a transfer operating shaft 119. Secured to the shaft 119 is the drive sprocket 120 which is likewise driven from a chain and sprocket connection 121 from the operating machine shaft 114. Secured to the shaft 119 (Figure 15) is a crank arm 122 which carries a crank pin 123. Secured to the crank pin 123 in fixed relation thereto is a second crank arm 124. Journaled on the crank arm pin 125 is a pull-down arm 126, and journaled on the crank pin 123 is the oscillator arm 127. Both of these arms for actuating the rod 106 and for swinging the post 96 are actuated from the same crank arm 122.

Secured to the frame plate 128 is a bracket 129 in which bracket there is secured a hollow shaft 130. Secured to a shaft 130a journaled in the hollow shaft 130 is a swing bracket 131 which carries a supporting collar 132 in which the post 96 is mounted. Pivoted at the end of the swing arm 127 is a swing arm link 133 which is journaled to the shaft 130a.

The pull-down arm 126 is pivotally connected to a pull-down link 134 (Figure 15) which is journaled on the shaft 130 and the link 134 carries a cam 135. The cam 135 engages a cam roller 136 carried by the operating arm 108. The arm 108 is pivoted at a pin 137 to the swing bracket 131. A cam spring 138 is connected with the operating arm 108 and with a bracket 139 carried by the spring bracket 131. Thus the entire operating mechanism is supported by the swing bracket 131 which is oscillated around its pivotal support by the swing arm 127, and during this operation the pulldown arm 126 actuates the cam 135 to cause the operating arm 108 in proper timed relation to pull the rod 106 downward to close the clamps or gripping elements 89 in timed relation with the operation of both the fruit supports 2 and the impaling blade 7 of the operating machine.

Figure 19:
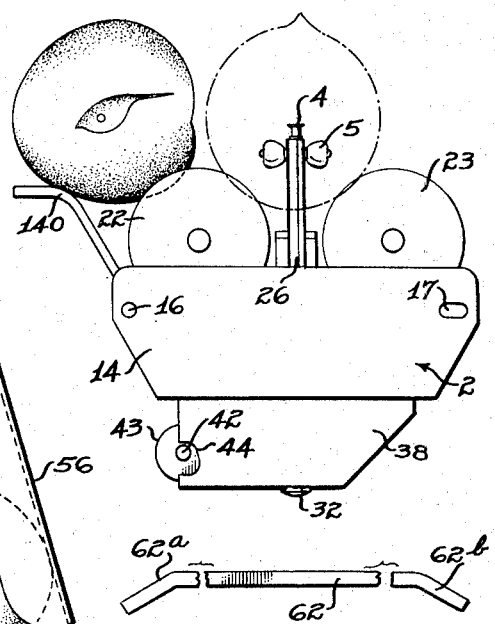
Figure 18:
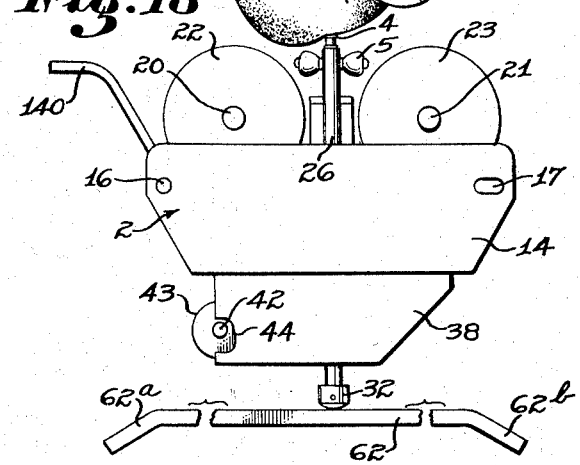

In Figures 17, 18 and 19 the operation of the dislodging of improperly oriented fruit from the supports 2 will be evident. In Figure 17 I have illustrated a fruit properly oriented between the rollers 22 and 23 and where the finder 4 has located the calyx depression and the wings 5 are located along the major axis of this depression so as to hold the fruit in proper oriented position. When thus properly oriented, the fruit will not be rotated by the rollers 22 and 23 but will remain in stationary oriented position. Fruit carried by the supports 2 where the finder 4 has failed to find the calyx depression will at the time of passing under the ejector plate 56 be engaged on their outer periphery by this plate 56 and will be pushed off from the finder 4 and the rollers 22 and 23 when finder 4 is raised just before contacting ejector plate 56 to a position where they will be supported by a bar 140 carried by the frame plates of the supports 2 in engagement with the rearmost rollers 22 and will thus be out of position to be gripped by the clamps or gripping elements 89. The fruit in this position, as illustrated in Figure 19, will then be discharged from the orienting machine onto a return conveyor (not shown) or other suitable point of disposal where it may either be returned to the hopper 1 for passing through the orienting device again or may be otherwise disposed of.

I have illustrated in Figure 18 (in quite an exaggerated manner) the raising of the fruit from the rollers 22 and 23 by the lifting of the plate 62, raising the finder 4 to a position where the fruit is raised to an unstable position either out of engagement with both of the rollers 22 and 23, but usually where the fruit is supported between the finder 4 and one of the said rollers 22 or 23. In this position the fruit is not engaged by the finder 4 or the wings 5 and the mere act of passing the same under the ejector 56 will cause the fruit to be rolled backward on the support 2 into position in engagement with the plate 140 (Figure 19).

In Figure 19 I have illustrated the normal position of the finder 4 where it is not depressed by the weight of a fruit showing the relative position of the finder 4 with reference to a fruit indicated therein in dotted lines.

Having fully described my invention, it is to be understood that I do not wish to be limited to the details herein set forth, but my invention is of the full scope of the appended claims.

I claim:

1. In a fruit orienter, the combination of a fruit supporting and orienting unit upon which a fruit to be oriented is supported, a calyx indent finder carried by said unit, means for rotating a fruit on the supporting and orienting unit to scan the surface of the fruit with the finder to locate the calyx indent of the fruit, and means for raising the calyx indent finder and vibrating the same while the same is engaged in the calyx indent of the fruit to orient the fruit as to the plane of suture of the fruit.

2. In a fruit aligner, the combination of a conveyor, a fruit supporting and orienting member carried by the conveyor and upon which a fruit to be aligned is supported, a calyx indent finder carried by said member, means for rotating a fruit supported by the fruit support to scan the fruit surface with the finder, and means for raising the indent finder and the finder having a wing extending laterally therefrom to engage within an elongated indent in the fruit whereby the finder on location of the said indent will hold the fruit on the support when the fruit is raised off the support.

3. In a fruit aligner, the combination of a conveyor, a fruit supporting and aligning member carried by the conveyor and upon which a fruit to be oriented is supported, a calyx indent finder carried by said member, said calyx indent finder having a laterally extending wing, and means for rotating the fruit to scan the fruit surface with the finder whereby the finder on location of the calyx indent will pass into said indent and the wing will extend into the indent in the direction of the greatest diameter of the indent, and will hold the fruit on the support from rotation by the rotating means.

4. In a fruit orienting mechanism, the combination of a fruit support having a multiplicity of fruit supporting cones upon which the fruit to be oriented is positioned, means for driving the cones to rotate the fruit, and a yieldably mounted calyx indent finder supported within the pocket between the cones in position to engage the fruit supported by the cones so that the fruit finder will scan the surface of the fruit while it is rotated and the calyx finder having a pair of laterally extending wings carried by the indent finder and adapted to pass into the calyx depression of the fruit with the indent finder to engage the fruit in the long section of the calyx indent to orient the fruit when the finder is vibrated up and down, and means for vibrating the indent finder.

5. In a fruit orienting mechanism, the combination of a fruit support having a multiplicity of fruit supporting cones upon which the fruit to be oriented is positioned, means for driving the cones to rotate the fruit, and a yieldably mounted calyx indent finder supported within the pocket between the cones in position to engage the fruit supported by the cones so that the fruit finder will scan the surface of the fruit while it is rotated and the calyx finder having a pair of laterally extending wing rollers carried by the indent finder and adapted to pass into the calyx depression of the fruit with the indent finder to engage the fruit in the long section of the calyx indent to orient the fruit.

6. In a fruit orienter, the combination of a conveyor, a fruit supporting and orienting member carried by the conveyor and including a plurality of conical rollers upon which a fruit to be oriented is supported, means for driving the rollers to rotate the fruit as supported thereby, and a calyx indent finder carried by said member in position to engage the surface of the fruit supported by the rollers, the calyx indent finder having an engaging head and a laterally extending wing adapted to engage within an elongated indent in the fruit.

7. In a fruit orienter, the combination of a fruit supporting and orienting member, comprising two pairs of conical supporting rollers between which a fruit to be oriented is supported, means for driving one of said rollers to impart a rotation to the fruit supported thereby, a calyx finder positioned between said rollers to engage the under surface of a fruit supported by the rollers so that the calyx finder will scan the surface of the fruit as the fruit is rotated, and the calyx finder having a laterally extending wing adapted to engage in the elongated calyx cavity of a fruit to orient the fruit on the supporting members with reference to the elongation of the calyx indent.

8. In a fruit orienter, the combination of a fruit supporting and orienting member comprising a plurality of conical supporting rollers, means for driving one of the rollers to rotate a fruit supported thereby, and a calyx indent finder positioned between the conical supporting rollers to engage the periphery of a fruit supported thereby and to scan the surface of the fruit as rotated, the calyx indent finder having a pair of laterally extending wing members extended from below the head of the calyx and adapted to pass with the calyx finder into an elongated calyx indent of a fruit to orient the fruit as the calyx finder locates the calyx indent.

9. In a fruit orienter, the combination of a fruit supporting and orienting member comprising a plurality of conical supporting rollers, means for driving one of the rollers to rotate a fruit supported thereby, and a calyx indent finder positioned between the conical supporting rollers to engage the periphery of a fruit supported thereby and to scan the surface of the fruit as rotated, the calyx indent finder having a pair of laterally extending wing members extended from below the head of the calyx finder and adapted to pass with the calyx finder into an elongated calyx indent of a fruit to orient the fruit as the calyx finder locates the calyx indent, the said wings comprising substantially conical rollers the smaller ends of which are positioned toward the axis of the calyx indent finder.

References Cited in the file of this patent

UNITED STATES PATENTS

| | | |
|---|---|---|
| 1,742,653 | Goranson | Jan. 7, 1930 |
| 1,905,476 | Lorenz | Apr. 25, 1933 |
| 2,265,515 | Carroll | Dec. 9, 1941 |
| 2,296,490 | Ashlock | Sept. 22, 1942 |
| 2,387,709 | Ashlock | Oct. 30, 1945 |
| 2,406,311 | Ashlock | Aug. 27, 1946 |
| 2,415,997 | Eldred | Feb. 18, 1947 |
| 2,568,947 | Carroll | Sept. 25, 1951 |